United States Patent

[11] 3,588,714

[72] Inventor Duane E. McIntosh
Palmyra, Wis.
[21] Appl. No. 837,776
[22] Filed June 30, 1969
[45] Patented June 28, 1971
[73] Assignee General Motors Corporation
Detroit, Mich.

[54] SYSTEM FOR RECONSTRUCTING A DIGITAL SIGNAL
4 Claims, 2 Drawing Figs.

[52] U.S. Cl. .......... 328/164, 325/65, 328/162, 328/167
[51] Int. Cl. .......... H03k 1/04
[50] Field of Search .......... 328/162-—167; 325/65, 473

[56] References Cited

UNITED STATES PATENTS 3,117,278 1/1964 Johnson .......... 325/65

*Primary Examiner*—Donald D. Forrer
*Assistant Examiner*—David M. Carter
*Attorneys*—William S. Pettigrew and C. R. Meland

ABSTRACT: A system is provided for reproducing a transmitted signal having alternate upper and lower voltage levels from a received signal representing the transmitted signal contaminated with high and low frequency noise. A reference signal is developed having a voltage level which is nominally midway between the upper and lower voltage levels of the transmitted signal, and which is shifted in response to the low frequency noise within the received signal. A local signal is produced having the upper voltage level when the voltage level of the received signal is above the voltage level of the reference signal, and having the lower voltage level when the voltage level of the received signal is below the voltage level of the reference signal. The local signal duplicates the transmitted signal.

INVENTOR.
Duane E. McIntosh
BY
C. R. Meland
ATTORNEY

SYSTEM FOR RECONSTRUCTING A DIGITAL SIGNAL

The invention herein described was made in the course of work under a contract or subcontract thereunder with the Department of Defense.

This invention relates to an apparatus for reconstructing an undistorted digital signal from a digital signal which has been contaminated by noise.

A digital signal is a voltage signal having alternate upper and lower voltage levels. In the course of transmission, it is common for a digital signal to be contaminated by high and low frequency noise. This noise contamination may so alter the bilevel voltage characteristics of the digital signal as to severely hamper recovery of the information carried by the digital signal. Therefore, before detecting the intelligence contained within the digital signal, it is desirable to reproduce the digital signal eliminating the noise distortion. Consequently, the subject invention proposes a system for reproducing a transmitted digital signal from a received digital signal representing the transmitted digital signal contaminated with high and low frequency noise.

According to one aspect of the invention, the voltage level of a local digital signal varies in response to the relationship of the voltage level of the received signal to the voltage level of a reference signal. The voltage level of the reference signal is nominally midway between the upper and lower voltage levels of the transmitted signal. The local signal is at an upper voltage level identical to the upper voltage level of the transmitted signal when the voltage level of the received signal is above the voltage level of the reference signal. Similarly, the local signal is at a lower voltage level identical to the lower voltage level of the transmitted signal when the voltage level of the received signal is below the voltage level of the reference signal.

In another aspect of the invention, the voltage level of the reference signal varies in response to the voltage level of the low frequency noise within the received signal so that the local signal duplicates the transmitted signal. The low frequency noise is recovered from the received signal by subtracting the local signal from the received signal and by filtering out the high frequency noise from the received signal. The low frequency noise is applied to the reference signal to shift the voltage level of the reference signal.

The invention may be best understood by reference to the following detailed description of a preferred embodiment when considered in conjunction with the accompanying drawing, in which.

Figure 2:
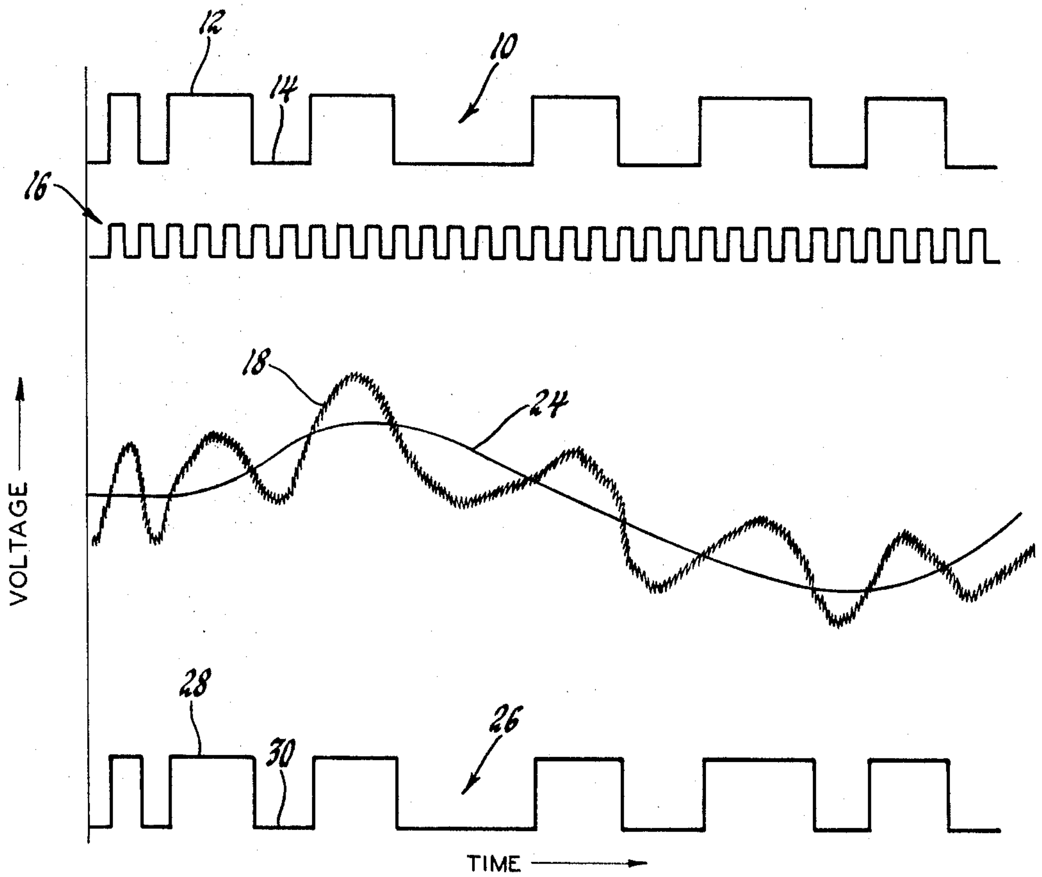
FIG. 2 is a graph of several waveforms useful in describing the operation of the system illustrated in FIG. 1.

FIG. 2 discloses a digital signal 10 representing a bilevel data signal as it might appear when transmitted from a remote location. The transmitted signal 10 is a pulse code modulated signal alternately having an upper voltage level 12 and a lower voltage level 14. The digital information carried by the transmitted signal 10 is represented by the number of binary data bits contained within the discrete time intervals during which the signal is at either the upper voltage level 12 or the lower voltage level 14. Hence, if the upper voltage level 12 represents a binary 1 level and the lower voltage level 14 represents a binary 0 level, the time interval between transitions in the voltage level of the transmitted signal 10 represents the number of successive 1 or 0 data bits being transmitted.

FIG. 2 also discloses a clock signal 16 comprising a plurality of pulses having a frequency such that the time period between the leading edge of one pulse and the leading edge of the next pulse represents a single data bit. The number of successive binary 1 and 0 data bits carried by the pulse code modulated signal 10 may be determined by counting the number of pulses in the clock signal 16 between transitions in the voltage level of the transmitted signal 10. Hence, in order to recover the digital intelligence contained within the transmitted signal 10, it is necessary to detect both the voltage level of the signal 10 and the discrete time intervals between transitions in the voltage level of the signal 10.

FIG. 2 further discloses a signal 18 representing the transmitted digital signal 10 as it might appear when received from the remote transmitting location. The received signal 18 is contaminated by high and low frequency noise. The high frequency noise is manifested by the sharp variations in the outline of the signal 18 exhibiting a relatively high voltage level rate of change. The low frequency noise is manifested by the gradual drift in the general voltage level of the signal 18 exhibiting a relatively low voltage rate of change. It will be appreciated that any attempt to detect the digital information contained within the received signal 18 by sensing transitions in the voltage level of the signal 18 will be subject to serious error due to the presence of the high and low frequency noise. Therefore, before detecting the digital intelligence carried by the received signal 18, it is desirable to reproduce the transmitted signal 10 from the received signal 18 free of the high and low frequency noise.

Figure 1:
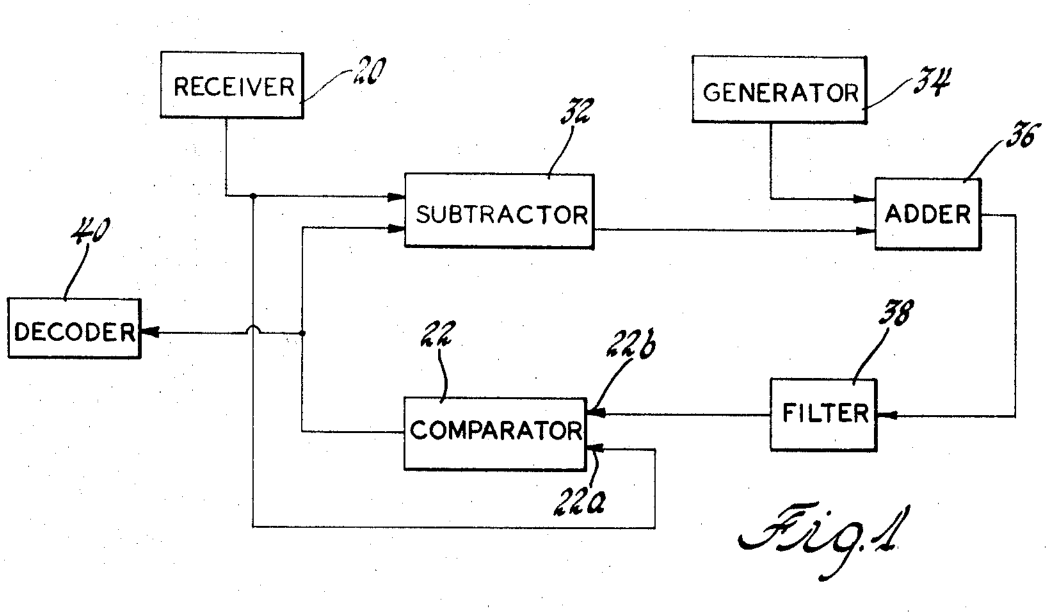
FIG. 1 is a block diagram of a digital signal reconstruction system incorporating the principles of the invention.

FIG. 1 discloses a digital signal reconstruction system for providing a substantially exact replica of the transmitted signal 10 from the received signal 18. A receiver 20 accepts the received signal 18 and applies it to the illustrated digital signal reconstruction system. A comparator 22 is connected to the receiver 20 for receiving the received signal 18 at one input **22*a*. Further, the comparator 22 is connected to receive a reference signal 24, as shown in FIG. 2, at another input 22*b*. The production of the reference signal 24 is fully described hereinafter. The received signal 18 and the reference signal 24 are compared by the comparator 22 which produces a local signal 26 as shown in FIG. 2. The local signal 26 has an upper voltage level 28 when the voltage level of the received signal 18 is above the voltage level of the reference signal 24. Similarly, the local signal 26 has a lower voltage level 30 when the voltage level of the received signal 18 is below the voltage level of the reference signal 24**.

A subtractor 32 is connected to the receiver 20 for receiving the received signal 18 and is connected to the comparator 22 for receiving the local signal 26. The local signal 26 is subtracted from the received signal 18 by the subtractor 32 to obtain a noise signal representing the high and low frequency noise contained within the received signal 18. A signal generator 34 produces a bias signal having a voltage level which is nominally midway between the upper voltage level 12 and the lower voltage level 14 of the transmitted signal 10. An adder 36 is connected to the signal generator 34 for receiving the bias signal and is connected to the subtractor 32 for receiving the noise signal. The bias signal is added to the noise signal by the adder 36 thereby to shift the voltage level of the noise signal by the voltage level of the bias signal. A filter 38 having low pass characteristics is connected to the adder 36 for receiving the noise signal after the voltage level of the noise signal has been increased by the voltage level of the bias signal. The filter 38 removes the high frequency noise from the noise signal thereby to obtain the reference signal 24. The comparator 22 is connected to the filter 38 to receive the reference signal 24 for comparing it with the received signal 18 as previously described. It is to be understood that the subtracting, biasing and filtering operations performed upon the received signal 18 may be accomplished in any desired order in obtaining the reference signal 24.

It will now be readily appreciated that the reference signal 24 represents a summation of the bias signal and the low frequency noise within the received signal 18. In effect, the subtractor 32 removes the transmitted signal 10 from the received signal 18, and the filter 38 removes the high frequency noise from the signal 18. The resultant signal represents the low frequency noise within the received signal 18. The adder 36 effectively increases the voltage level of the bias signal by the voltage level of the low frequency noise. Thus, the voltage level of the reference signal 24 is nominally midway between the upper voltage level 12 and the lower voltage level 14 of the transmitted signal 10, and is shifted in response to the low frequency noise within the received signal 18.

It will now be observed that the upper voltage level 28 of the local signal 26 is identical to the upper voltage level 12 of the transmitted signal 10. Similarly, the lower voltage level 30 of the local signal 26 is identical to the lower voltage lever 14 of the transmitted signal 10. Thus, the local signal 26 duplicates the transmitted signal 10. A decoder 40 is connected to the comparator 22 for receiving the local signal 26. The digital information carried by the local signal 26 is recovered by the decoder 40 utilizing the clock signal 16 previously described.

Preferably, the subtractor 32 and the adder 36 are provided by Fairchild Model 709 differential amplifiers, and the comparator 22 is provided by a Fairchild Model 710 voltage comparator. These devices are readily available from the Fairchild Camera and Instrument Corporation, Semiconductor Division, 313 Fairchild Drive, Mountain View, California 94041. In such instance, the received signal 18 is applied to the negative input and the local signal 26 is applied to the positive input of the differential amplifier representing the subtractor 32. Thus, the received signal is actually subtracted from the local signal in obtaining the noise signal. Further, the noise signal is applied to the negative input and the bias signal is applied to the positive input of the differential amplifier representing the adder 36. Hence, the noise signal is actually subtracted from the bias signal in obtaining the reference signal 24. The voltage generator 34 may be provided by a suitable direct current voltage source coupled with a conventional potentiometer. The filter 38 may be provided by a simple RC network having the required low-pass characteristics.

It is to be understood that the preferred embodiment of the invention described herein is disclosed for illustrative purposes only and that various modifications and alterations may be made thereto without departing from the spirit and scope of the invention.

I claim:

1. An apparatus for reproducing a transmitted signal having alternate upper and lower voltage levels from a received signal representing the transmitted signal contaminated with high and low frequency noise, the apparatus comprising: comparator means connected to receive the received signal and a reference signal for producing a local signal, the local signal having an upper voltage level identical with the upper voltage level of the transmitted signal when the voltage level of the received signal is above the voltage level of the reference signal, and the local signal having a lower voltage level identical to the lower voltage level of the transmitted signal when the voltage level of the received signal is below the voltage level of the reference signal; and means connected to receive the received signal and the local signal for producing the reference signal including, subtractor means for subtracting the local signal from the received signal, bias means for increasing the voltage level of the received signal by a voltage level nominally midway between the first and second voltage levels of the transmitted signal, and filter means for removing the high frequency noise from the received signal, whereby the local signal is a reproduction of the transmitted signal.

2. An apparatus for reproducing a transmitted signal having alternate upper and lower voltage levels from a received signal representing the transmitted signal contaminated with high and low frequency noise, the apparatus comprising: generator means for producing a reference signal having a voltage level which is nominally midway between the upper and lower voltage levels of the transmitted signal; comparator means connected to receive the received signal and the reference signal for producing a local signal, the local signal having an upper voltage level identical with the upper voltage level of the transmitted signal when the voltage level of the received signal is above the voltage level of the reference signal, and the local signal having a lower voltage level identical to the lower voltage level of the transmitted signal when the voltage level of the received signal is below the voltage level of the reference signal; means connected to receive the received signal and the local signal for producing a noise signal representing the low frequency noise within the received signal including, subtractor means for subtracting the local signal from the received signal, filter means for removing the high frequency noise from the received signal; and adder means connected to receive the reference signal and the noise signal for adding the noise signal to the reference signal to shift the voltage level of the reference signal, whereby the local signal duplicates the transmitted signal.

3. An apparatus for reproducing a transmitted signal having alternate upper and lower voltage levels from a received signal representing the transmitted signal contaminated with high and low frequency noise, the apparatus comprising: comparator means connected to receive the received signal and a reference signal for producing a local signal, the local signal having an upper voltage level identical with the upper voltage level of the transmitted signal when the voltage level of the received signal is above the voltage level of the reference signal, and the local signal having a lower voltage level identical to the lower voltage level of the transmitted signal when the voltage level of the received signal is below the voltage level of the reference signal; subtractor means connected to receive the local signal and the received signal for subtracting the local signal from the received signal to obtain a noise signal representing the high and low frequency noise contained within the received signal; generator means for producing a bias signal having a voltage level which is nominally midway between the first and second voltage levels of the transmitted signal; adder means connected to receive the noise signal and the bias signal for adding the bias signal to the noise signal thereby to increase the voltage level of the noise signal and filter means connected to receive the noise signal for removing the high frequency noise from the noise signal to obtain the reference signal, whereby the local signal duplicates the transmitted signal.

4. An apparatus for reproducing a transmitted signal having alternate upper and lower voltage levels from a received signal representing the transmitted signal contaminated with high and low frequency noise, the apparatus comprising: comparator means connected to receive the received signal and a reference signal for producing a local signal, the local signal having an upper voltage level identical to the upper voltage level of the transmitted signal when the voltage level of the received signal is above the voltage level of the reference signal, and the local signal having a lower voltage level identical to the lower voltage level of the transmitted signal when the voltage level of the received signal is below the voltage level of the reference signal; generator means for producing a bias signal having a voltage level which is nominally midway between upper and lower voltage levels of the transmitted signal; first differential amplifier means connected to receive the received signal and the local signal for subtracting the received signal from the local signal to obtain a noise signal representing the high and low frequency noise contained within the received signal; second differential amplifier means connected to receive the noise signal and the bias signal for subtracting the noise signal from the bias signal to shift the voltage level of the noise signal; and filter means connected to receive the noise signal for removing the high frequency noise from the noise signal to obtain the reference signal, whereby the local signal is a reproduction of the transmitted signal.